Dec. 4, 1962     G. E. VANA     3,066,385
TOOL HOLDER
Filed March 23, 1960
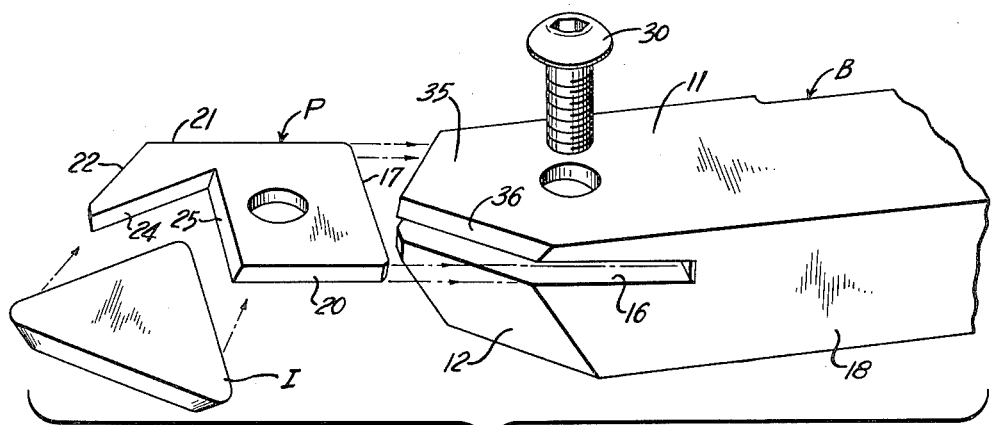
Fig. 1.
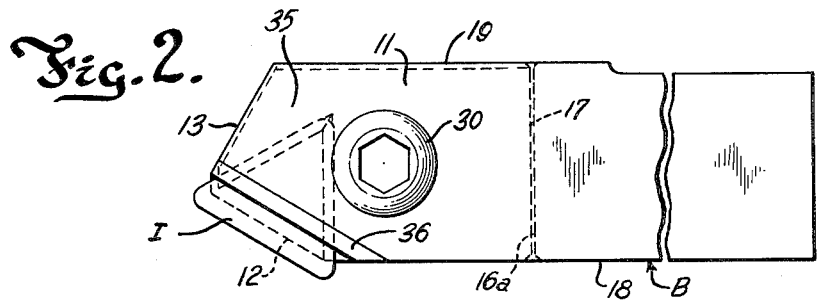
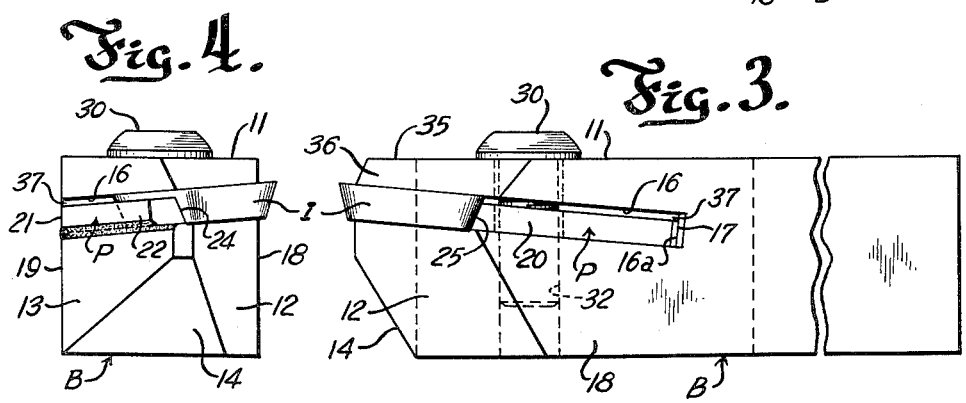
INVENTOR.
GEORGE E. VANA
BY Lieber, Lieber & Nilles
Attorneys Patented Dec. 4, 1962

3,066,385
TOOL HOLDER
George E. Vana, Milwaukee, Wis., assignor to Industrial Mills, Inc., Milwaukee, Wis., a corporation of Illinois
Filed Mar. 23, 1960, Ser. No. 17,033
2 Claims. (Cl. 29—96)

This invention relates to a tool holder of the type that is adapted to clamp a cutting tool or bit, such as a carbide insert in the holder.

Various prior art devices of this general type have heretofore been used with success, and have utilized separate clamping members to adjustably secure an insert on the body of the tool holder. These clamping members can be loosened so as to slide the insert on the body and the clamp retightened, thus presenting a new cutting surface of the insert or changing the cutting angle of the insert relative to the work. For this purpose, some of these prior art devices have employed guide surfaces formed directly in the body of the holder along which the insert is adjusted, and other prior structures have guide surfaces cut directly in the clamp member along which the bit is adjustably moved. Examples of these devices are illustrated by the U.S. Patents Number 2,452,877, 2,598,581 and 2,716,800.

Still other prior art tool holders are of a type mentioned above, and further include a separate positioning plate which is held between the holder body and the clamp, and against which plate the bit is shiftably adjusted. Examples of this type of holder are shown in the U.S. Patents Number 2,791,824 and 2,887,760 and also in the British Patent Number 159,783 of March 10, 1921.

The general type of tool holder above mentioned and with which the present invention is concerned is usually very small and the component parts thereof, such as the clamps, guide plates, set screws and tool inserts are even smaller, thus making it a rather difficult and time consuming task to adjust, replace, disassemble or assemble the parts, the procedure often attended by lost or misplaced parts.

Accordingly, the present invention provides an improved tool holder for a replaceable or adjustable bit insert, which holder contains a minimum number of parts consonent with complete and easy adjustability of the bit and without sacrificing any of the functions required of such holders.

More specifically, the present invention provides a tool insert holder in which the clamp member is made as an integral part of the holder body by forming a slot in the body of a certain relative thickness; a positioning plate is located in the slot but is of a lesser thickness than the slot; and an insert is adapted to be located in the slot for being accurately positioned against the plate in any one of a number of positions, the thickness of the insert being greater than that of the positioning plate and approximately the same thickness as the slot, but in any event no greater than the latter.

Still more specifically, the present invention provides a holder of the immediate above type in which the positioning plate is securely and unadjustably held in the body slot. In this manner it is only necessary to slightly loosen the securing means in order to unclamp the insert and remove it for repositioning or replacement, the plate in the meantime being held captive in the body slot.

These and other objects and advantages of the present invention will appear later as this disclosure progresses, reference being had to the accompanying drawings, in which:

FIGURE 1 is a perspective, exploded view of a holder made in accordance with the present invention;

FIGURE 2 is a plan view of the holder when assembled;
FIGURES 3 and 4 are side and front end views, respectively, of the holder as shown in FIGURE 2.

Referring in greater detail to the drawings, the elongated rectangular shank or body B of the holder terminates in a front or bit receiving end 11. This working or front end of the body has side flank faces 12 and 13 which converge forwardly and are also inclined downwardly and rearwardly. Flank surfaces 12 and 13 meet at their front edges with the front, rearwardly and downwardly slanting, clearance surface 14. The front end of the body is thus generally pointed.

A slot 16 is formed in the front end of the body and extends in a generally axial direction in respect to the elongated body. This slot is sloped downwardly (FIG. 3) from the front end of the holder to give the desired back rake. FIGURE 4 shows that this slot is also inclined from one of its sides to the other to provide side rake, and in the illustration shown this incline is downwardly from the cutting side to give a positive side rake. The rear side 16a of slot 16 is formed as a straight edge (FIG. 2) and thus the slot is readily formed in the body.

A positioning plate P is of a thickness less than that of slot 16 and has a straight back edge 17 which abuts against slot edge 16a when the plate is inserted in the slot. This not only firmly seats the plate in the slot, but also accurately positions the guide edge (to be described) of the plate with respect to the body. The plate is brazed in the slot so as to fix it therein and prevent its displacement and loss, but this brazing must also be done in such a manner as to not restrict clamping action of the holder. This brazing is therefore preferably done along the chamfered lower corner (FIGURE 4) of edges 21 and 22 so that unrestricted clamping action can occur and also to prevent fracture of the positioning plate when the tool bit is under pressure.

The plate can be brazed in place before the body sides 18, 19, and surface 13 are finally finished so that the corresponding edges 20, 21 and 22 of the plate are flush with their respective body surfaces.

The plate P has guide or seat surfaces 24, 25 formed thereon and against which the tool bit I firmly abuts when in operating position. These guide edges 24, 25 may, of course, be varied as to their number of position, depending on the shape of the insert bit which they complement.

The particular bit I shown is of triangular shape which has three separate cutting edges that may be selectively presented to the workpiece (not shown).

It will be noted that the thickness of this plate-like bit is greater than that of the positioning plate and approximates the thickness of the slot. The bit can thus be easily but snugly inserted in the slot and against the guide edges of the plate when the securing means, in the form of set screw 30, is not tightened down in the tapped hole 32 in the body. The screw extends freely through the plate and through the upper clamping portion 35 of the body.

The clamping lip 35 is relatively thin in order that it can be flexed downwardly tightly against the bit when the screw 30 is tightened, thus securely clamping the bit in place.

The slot is formed adjacent the top surface of the body, that is, it is formed in the upper portion of the body, and thereby a relatively thick portion of the body is located beneath the tool for unyielding and rigid support thereof.

The integrally formed clamping lip cannot be lost or misplaced, and as it is an integral part of the body it cannot shift when tightened down. The leading or cutting side of the lip is beveled, as at 36 to provide for chip clearance.

It will be noted, particularly from FIGURES 3 and 4, that a clearance 37 is provided between the positioning plate P and the clamping lip so as to insure that the lip will firmly engage and clamp the bit in place. On the other hand the plate is of sufficient thickness to form accurate and firm guide surfaces for the bit.

There is no danger of the clamping member 35 or the plate P becoming lost, and furthermore the necessity for and expense of machining a separate clamping piece has been eliminated.

Various modes of carrying out the invention are contemplated as being within the scope of the following claims particularly pointing out and distinctly claiming the subject matter which is regarded as the invention.

I claim:

1. A tool holder comprising, an elongated rectilinear body having a slot extending transversely entirely across and longitudinally into said body from one end and adjacent the top surface of said body, said slot being inclined downwardly and rearwardly relative to the adjacent top body surface to provide an integral tapered clamping lip decreasing in thickness toward its free end, a positioning plate located in said slot and having a guide edge, the thickness of said plate being less than that of said slot, a replaceable tool bit of greater thickness than said positioning plate insertable in said slot and abuttable against said guide edge and having a cutting edge extending from said slot, said lip having a bore extending through a medial portion thereof within the tapered area and said positioning plate and body having corresponding coaxial bores, and a clamping screw extending through said lip and plate bores and having screw-threaded coaction with said body whereby the free end of said lip is swung into clamping engagement with said bit upon tightening said screw.

2. A tool holder according to claim 1, wherein the clamping lip and adjacent body portion have corresponding angular front edges and the slot is also inclined laterally relative to the adjacent top body surface to provide a lip which is tapered so as to decrease in thickness toward one side edge as well as toward its free end.

References Cited in the file of this patent

UNITED STATES PATENTS

| 2,390,175 | Rogos | Dec. 4, 1945 |
| 2,425,242 | Herring | Aug. 5, 1947 |
| 2,887,760 | Armstrong | May 26, 1959 |

FOREIGN PATENTS

| 159,783 | Great Britain | Mar. 10, 1921 |
| 572,063 | Great Britain | Sept. 20, 1945 |
| 701,534 | France | Jan. 12, 1931 |
| 1,164,677 | France | May 19, 1958 |
| 1,185,161 | France | Feb. 9, 1959 |